United States Patent [19]
Svatek

[11] 4,290,692
[45] Sep. 22, 1981

[54] PHOTOGRAPHIC STROBE APPARATUS
[75] Inventor: Thomas A. Svatek, Carlisle, Mass.
[73] Assignee: Polaroid Corporation, Cambridge, Mass.
[21] Appl. No.: 55,326
[22] Filed: Jul. 6, 1979

Related U.S. Application Data

[60] Division of Ser. No. 914,219, Jun. 9, 1978, abandoned, which is a continuation-in-part of Ser. No. 834,685, Sep. 19, 1977, abandoned.

[51] Int. Cl.³ .................. G03B 27/72; H05B 37/02
[52] U.S. Cl. ............................ 355/69; 315/241 P; 315/151; 315/171
[58] Field of Search .................. 355/35, 68, 69, 70, 355/83; 315/241 R, 241 P, 171, 151

[56] References Cited
U.S. PATENT DOCUMENTS 3,033,988  5/1962  Edgerton ..................... 250/205
3,065,667  11/1962  Edgerton .
3,438,766  4/1969  Biber .
3,813,158  5/1974  Zahn et al. .................. 355/38
4,151,446  4/1979  Ludloff ..................... 315/171 X

FOREIGN PATENT DOCUMENTS 829999  3/1960  United Kingdom .
882690  11/1961  United Kingdom .
1320455  6/1973  United Kingdom .

OTHER PUBLICATIONS

Kompendium der Photographie.

Primary Examiner—L. T. Hix
Assistant Examiner—W. J. Brady
Attorney, Agent, or Firm—David R. Thornton

[57] ABSTRACT

A strobe apparatus for reducing contrast index in photographic copies by employing an illumination pulse of short duration includes a source energizable at both a relatively high level to provide high intensity illumination and at a low level to provide low intensity illumination.

3 Claims, 15 Drawing Figures

"POLACOLOR 2" COPY OF SLIDE

PHOTOGRAPHIC STROBE APPARATUS

CROSS REFERENCE TO RELATED APPLICATION

This is a division of application Ser. No. 914,219, filed June 9, 1978, which is a continuation-in-part of application Ser. No. 834,685, filed Sept. 19, 1977 now abandoned.

BACKGROUND OF THE INVENTION

This invention relates to the reproduction of photographs and more particularly, it concerns a method and apparatus for making photographic copies of transparencies and prints using conventional photographic materials.

Photographs of natural objects are, at best, approximations of tonal qualities visible in such objects due to the limited capability of photographic materials to respond accurately and completely to all naturally occurring light. This limited capability of photographic materials may be appreciated by noting that accuracy of tone reproduction, whether of shades of grey in black and white photography, or of saturation levels of various colors in color photography, will depend, among other factors, primarily on "contrastiness" of the photographic material. Because of this, most all of the presently available general purpose photographic films are designed with some compromise between tone reproduction capacity and contrastiness to provide a pleasing effect to one viewing the photographic image recorded on the film. Color films and print materials are especially notable in this respect, particularly those which are designed to enhance the brilliance of naturally occurring colors.

Characteristics of photographic materials, such as sensitivity or speed, contrast, exposure latitude and tone reproduction are conventionally represented by Hurter and Driffield (H & D) curves in which density (transmission or reflection density) is plotted against the logarithm of exposure. "Density", in context, is defined either as the logarithm of opacity for transparencies or, for prints, as the logarithm 1/R, where R, the reflectance, is the ratio of light intensity reflected by the print to that falling on it. The H & D curve for a given photographic material has a "slope" which is representative of contrast and tone reproduction. Specifically, a slope of 1:1 or "1" is a theoretical optimum for accuracy of contrast and tone reproduction of light reflected from a naturally occurring object or scene. In practice, however, most general purpose photographic materials are designed such that a substantial part of the H & D curve has a slope significantly greater than 1, for example, 1.5:1 and often exceeding 2 (2:1). The increased slope is necessary to record the extensive light range occurring in nature on film having a limited light and dark range, and results in enhanced color saturation, for example, in color photography and provides a reproduction more pleasing to the average observer than one which is not so enhanced.

Although the recognition and use of the aforementioned characteristics of photographic materials has contributed to the highly refined state of the art now available for general purpose photography, the H & D characteristic curve relied on to provide enhanced photographic images, presents a problem to the use of general purpose material for copying existing photographically recorded images. With the development of instant photography using well-known diffusion transfer processes in which the positive print is obtained without the separate step of making an internegative, for example, attempts have been made to use such materials for direct copying of images either by exposure to light projected through slide transparencies or reflected from positive prints. The results obtainable heretofore, however, have been inferior because of excess constrast in the copy as compared to the original or to copies made with special copy film material. The excess contrast is known to be a result of the effective multiplication of the H & D characteristic curve slopes of both the original and copy materials in the copying process. For example, a slide or print with a constrast value represented by a slop of 2, when copied with a film having a similar slope, will result in a print copy with a constrast represented in an H & D curve slope of 4. For this reason, prior attempts at using general purpose films for copying slide transparencies or prints have been abandoned in favor of special purpose films or other photographic materials for which the H & D characteristic curve slope is 1, or less than 1, in order that the copy will be a pleasing reproduction of the original photograph.

In light of the foregoing, one having only a modest familiarity with color photography will appreciate the desirablility of a facility by which conventional photographic materials could be used to provide accurate reproductions of existing photographically recorded images. In particular, the use of existing diffusion transfer films and the ease with which they can be processed or developed exemplifies the magnitude of advance represented by such a facility over presently available dark room techniques for making color prints from slides, for example.

SUMMARY OF THE INVENTION

In its preferred form, the copy apparatus illuminates the original to be copied with a dual level strobe arrangement capable of emitting initial high intensity light for a very short time duration in the order of 4 microseconds or less, immediately followed by a quenchable, relatively low intensity light pulse for any remaining time within the short interval necessary to achieve proper exposure of the copy material. The light may be transmitted through the original in the case of slide transparencies or be reflected from the original in the case of opaque photographic prints.

Among the objects of the present invention are: the provision of a novel strobe apparatus for copying photographically recorded images; and the provision of an economical high intensity short pulse strobe apparatus.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
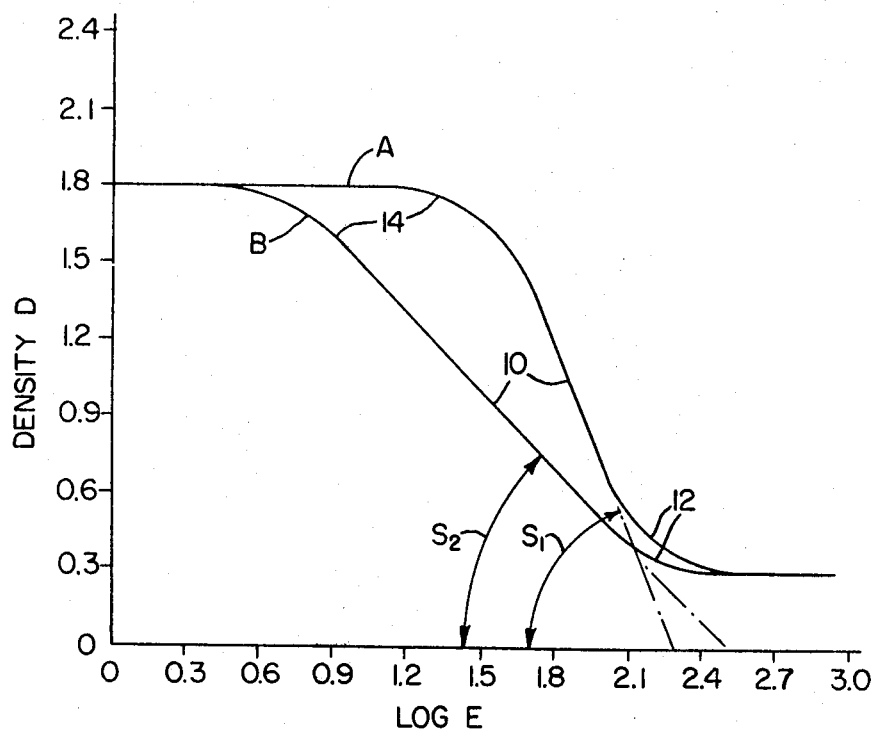
FIG. 1 is a graph illustrating two generalized H & D characteristic curves of photographic positive materials.

In FIG. 1 of the drawings, separate H & D curves A and B are shown as representing the sensitometric characteristics of positive photographic materials such as diffusion transfer film in which image density decreases with exposure (log E). Such H & D curves are well-known and are typically characterized as having a linear portion 10 of a slope S extending between a pair of curved sections termed a "toe" 12 and a "shoulder" 14. Although the overall H & D curve for a given photographic material is useful in identifying the complete characteristics of the material, the characteristic most significant to the present invention is represented by the slope S of the linear portion 10 which is indicative primarily of contrast index. Specifically, the contrast index varies directly with the slope S of the linear portion 10 and the H & D curve for a given photographic material. Also in this connection, where the characteristics of a given photographic material does not exhibit a well-defined linear slope portion 10, an average or arbitrarily defined slope S is conventionally defined by a line extended between the two points established by the curve intersection with horizontal lines representing one-quarter and three-quarters of the total density variation on the ordinate of the curve.

In FIG. 1, the curve A typifies a general purpose photographic material in which the contrast index is represented by a slope $S_1$. Particularly, such films are characteristized by a slope substantially greater than 1 and, for example, approaching a value of 2 (2 units of density for each unit log E) so as to provide an original photograph in which the contrast of image tones is enhanced over that of the original or that is, natural scene.

The curve B in FIG. 1, in which the slope S is unity or 1, typifies photographic materials most desirable for copying existing photographs. As explained previously, the contrast index of an existing photograph is effectively multiplied by the contrast index or slope of the photographic material used to copy the existing photograph. Hence, a copy material with an H & D curve slope of close to 1 will result in a more faithful reproduction of tonal contrast in the existing photograph.

Figure 2:
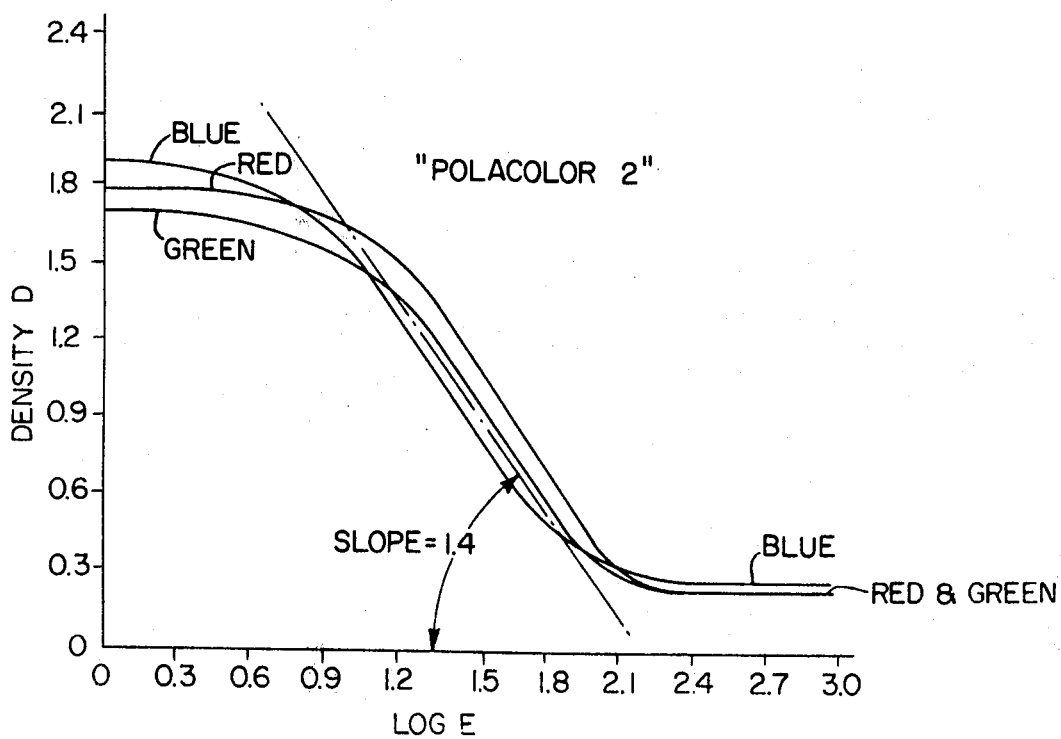
FIG. 2 illustrates an H & D characteristic curve for one commercially available, diffusion transfer color film.

The single line curves illustrated in FIG. 1 are customarily representative of photographic materials used in black and white photography, and although photographic materials used in color photography are similar, they are more accurately represented by a single line for each of the basic or primary colors, red, green and blue. Thus, in FIG. 2 of the drawings, representative H & D curves are shown for a conventional diffusion transfer color film of the type described in U.S. Pat. No. 4,009,031 and which is available commercially under the trademark "POLACOLOR 2". It will be noted that the curves for the respective primary colors or spectral wavelength ranges are similar to each other particularly in the linear portion of the curves determinative of contrast index. The film represented in FIG. 2 is shown to have H & D curve slope of 1.4. This slope, of course, falls within a range which is desirable from the standpoint of contrast enhancement and color saturation in producing an original photograph of a natural subject. However, the use of such film for copying existing photographs, using conventional exposure methods, would result in a photograph having excessive contrast.

The curves A and B illustrated in FIG. 1 typify a single type of general purpose photographic material employed respectively under conventional exposure conditions and the method of the present invention. That is, the curve A, in which the slope $S_1$ is substantially in excess of 1, represents general purpose material exposed in a conventional manner under normal light for a period well in excess of 100 microseconds, for example, 1/125 of a second (8,000 microseconds). The curve B represents the same type of material exposed under normal light for a short time period of less than 10 microseconds such that its H & D slope is modified to approximately 1. It should be noted that photographic film other than in special stop action situations is generally exposed with intervals much greater than 100 microseconds and usually for 1,000 microseconds (1 millisecond) or slightly greater intervals with strobe flash systems and at still much greater intervals for incandescent flash and ambient photographic exposures. Hence, the method of this invention is predicated in substantial measure on the unexpected discovery that the slope, and hence, the contrast index of at least certain photographic materials can be radically reduced when such materials are exposed for an extremely short time interval on the order of a few hundred microseconds or less, and that when such general purpose films are exposed in this manner to the image of an existing photograph and then developed, the contrast and tone qualities exhibited in the original photograph are reproduced in the copy with a minimum of distortion. As previously indicated, earlier attempts to utilize general purpose films and particularly diffusion transfer materials, to make copies of a photograph had theretofore proved generally unsatisfactory in that the copies obtained exhibited greatly distorted tonal gradations and in general were too contrasty. Thus, a loss of detail and exaggerated contrast rendered the copies unsatisfactory.

Figure 3:
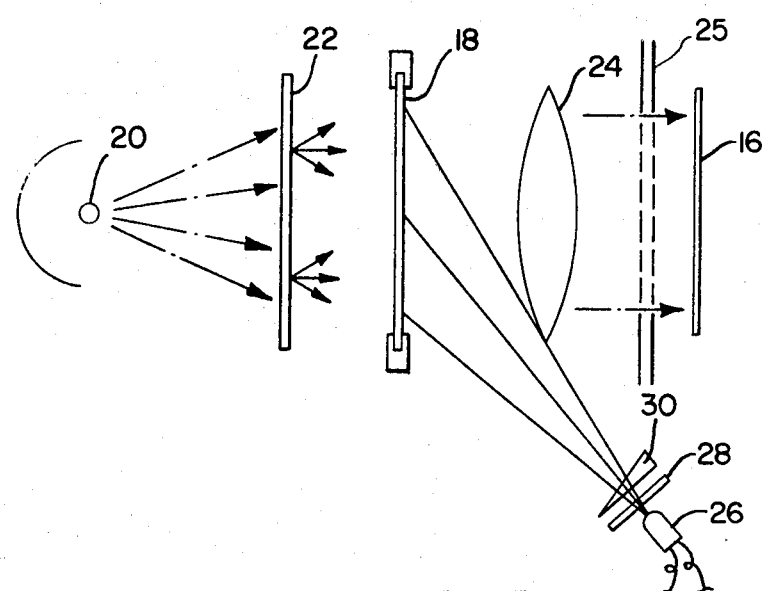
FIG. 3 is a schematic view illustrating a preferred embodiment of the apparatus of the present invention.

A more complete understanding of the method of this invention as well as one embodiment of an apparatus for its practice may be understood by reference to FIGS. 3-7 of the drawings. In FIG. 3, the organization of components used to expose a general purpose film 16 to light transmitted through a photographic positive transparency or slide 18 is shown schematically to include a strobe light source 20 and diffuser 22 mounted on one side of the slide 18 to be copied. Although the characteristics of the strobe light 20 will be described in more detail below, the diffuser 22 is a conventional diffuser such as opal glass which operates to disperse light from the strobe 20 uniformly across the slide transparency 18 to be copied. Image-forming light passing from the slide transparency is then transmitted through a photo-enlarging lens 24 by which it is focused on the copy film 16. The photo-enlarging lens 24 is used to provide a flat field, and it will be appreciated by those skilled in the art that other equivalent optical components may be used. A shutter or capping blade arrangement 25 is provided to ensure the light tight integrity of the film area and to permit slide evaluation, etc. prior to the exposure operations.

A silicon type photocell 26 is located off the optical axis of the lens 24 but in a position to receive the image carrying light passing through the slide transparency 18. Since light emitted by the strobe is preferably of a broad spectral composition satisfactory for use with general purpose color films, the photocell 26 should have a spectral response at least equal to the copy film 16. Silicon type cells have a response which is generally broader than that of conventional films and accordingly, an infrared filter 28 is positioned in front of the photocell 26 to eliminate most infrared radiation passing to the cell 26.

Sensitivity of the photocell 26 to light passing through the slide 18 is controlled by an adjustable filter wedge 30 to allow the operator to vary the copy in accordance with his personal taste. Also, it will be noted that while the location of the photocell 26 and correspondingly of the filters 28 and 30 may vary from that illustrated in FIG. 3, it is important only that the cell be positioned to receive an average of the light passing through the slide transparency 18 and that this light, impinging on the cell, be nearly proportional to the quantity of light passing through the slide and lens (and falling on the film) as necessary to obtain a correct exposure regardless of the density of the slides and the condition of the latter; that is, regardless of the cleanliness, and scratches, etc. of the slide. Opal glass diffusion was chosen to make the system insensitive to these factors. Preferably, the photocell tracking characteristics are chosen to provide slight under exposure of dark slides (such as night scenes) and slight over exposure of bright slides (such as beach or snow scenes).

Although a dual level strobe lamp (as explained below with regard to FIG. 6) is perhaps most economical for practice of the invention, a conventional strobe having high intensity and extremely short quenching capability may be utilized in practicing the invention. The latter strobe may be represented by the curve illustrated in FIG. 4 of the drawings in which strobe intensity is plotted against time duration of light emittance. Thus as in conventional quench strobes, having a maximum light emittance represented by the area under the curve 32, the quantity of light emitted may be reduced by quenching or turning off the lamp at shorter periods of times represented by the curves 34 in FIG. 4. In this manner, the time duration of strobe lamp emittance (designed for conventional exposure intervals of the order of 1 millisecond) may be reduced to a very short increment of time so as to practice the invention, such as for example, 100 microseconds.

Figure 6:
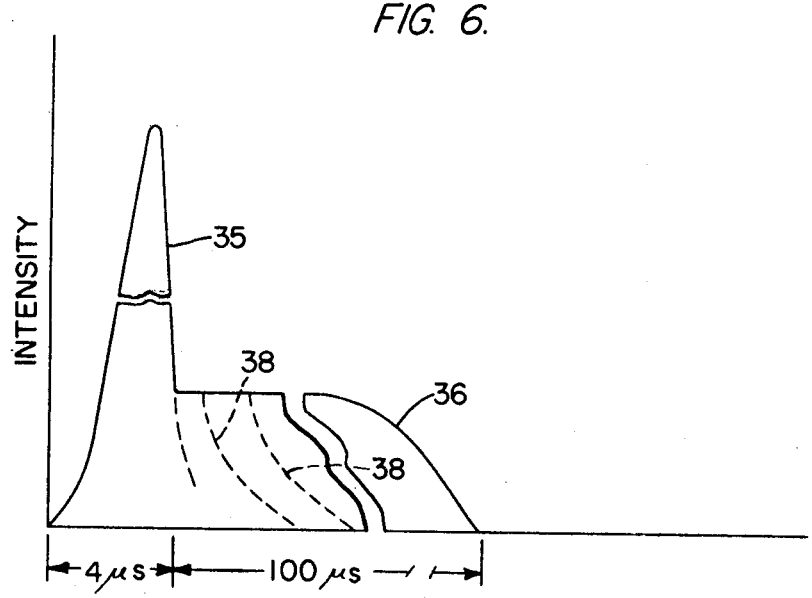
FIG. 6 is an illumination curve similar to FIG. 4 but illustrating the characteristics of illumination provided by the system diagrammed in FIG. 5.

A more practical and economical light source with adequate high intensity to expose the copy film 16 in a time interval ranging from 4 to 50 microseconds, is provided by operating the strobe lamp 20 to develop an integrated multiple value or dual level pulse curve exemplified in FIG. 6 of the drawings. In particular, a high intensity pulse of a short time duration approximating 4 microseconds is followed by relatively low intensity illumination for a longer period, preferably in the range of between 10 and 50 microseconds. In this way, the minimum amount of light required for proper exposure of the copy film 16 is represented by the area under the curve portion 35 shown in FIG. 6 to have a duration of 4 microseconds. Additional light needed for proper exposure is represented by the curve portion 36 and occurs during the ensuing time at quenched intervals 38 determined by the photocell 26.

Figure 5:
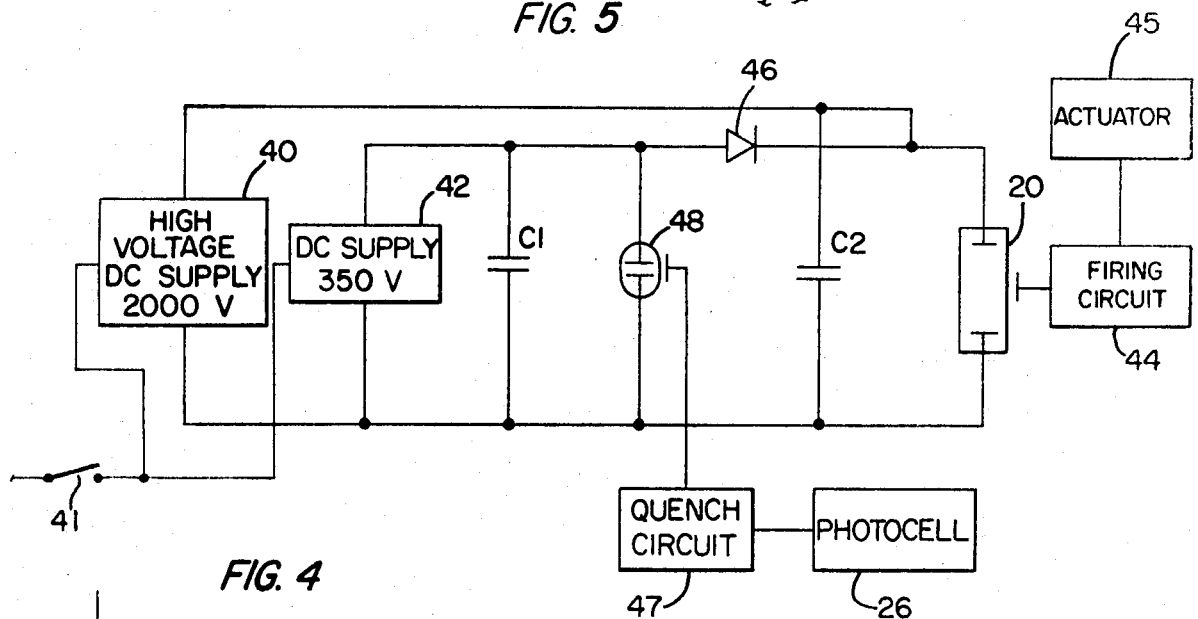
FIG. 5 is a circuit diagram of an economical illumination system providing a dual level pulse for use in the apparatus illustrated in FIG. 3.
Figure 4:
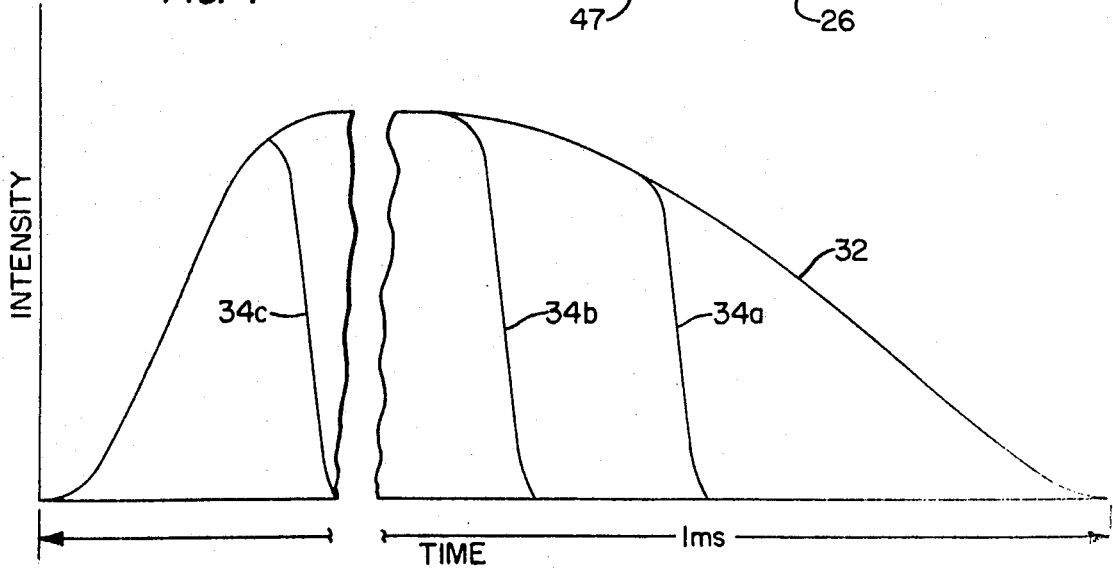
FIG. 4 is an illumination curve plotting intensity versus time for a uniform pulse illumination system which may be employed in the apparatus illustrated in FIG. 3.

A strobe circuit capable of providing the dual pulse curve of FIG. 6 is illustrated in FIG. 5 of the drawings. As shown, the circuit includes a high voltage DC supply 40 having an output on the order of 2,000 volts and a relatively low DC supply 42 of approximately 350 volts. The strobe lamp tube 20 which may be a Xenon tube, is designed to accept the 2,000 volts supply and controlled by a conventional firing circuit 44 triggered by an actuator 45. The 350 volt DC supply 42 is coupled with a capacitor C1 having a capacitance of approximately 500 microfarads and thus provide a relatively long time pulse. The high voltage supply 40 is coupled with a second capacitor C2 of approximately 4 microfarads to achieve the relatively short high intensity pulse represented by the curve portion 35 shown in FIG. 6. A diode 46 is coupled between the capacitor C1 and the lamp 20 to permit current flow from the low voltage DC supply 42 and the capacitor C1 to the lamp 20 while preventing current flow to the capacitor C1 and the low voltage supply 42 from the high voltage DC supply 40. In this respect, the diode 46 must be of a type capable of withstanding a back bias of 1750 to 2,000 volts and high peak currents. The photocell 26 is connected through a quench circuit 47 with a quenching tube 48 connected across the capacitor C1 in conventional fashion, but isolated from the strobe tube 20 by the diode 46.

Hence, it should be understood that the lamp 20, the diffuser 22 and the lens 24 provide means for projecting an image from an original to produce an exposure in the copy material while the wedge 30, the photocell 28, quench circuit 47 and the quench tube 48 provide means for controlling the above-defined projecting means to expose the copy material for a sufficiently short time duration to substantially reduce the H & D slope of the copy material, preferably to near 1 or less. Stated otherwise, the latter provides means for controlling the projection means to expose the copy material for a time sufficient to raise its H & D slope substantially close to 1, but insufficient to raise its slope to the slope value for which the general purpose film was designed.

In the operation of the circuit shown in FIG. 5, assuming the strobe which 41 is closed and the system energized for enough time such that the capacitors C1 and C2 are charged to their normal voltage level, when the actuator 45 is tripped, the firing circuit 44 ionizes the gas within the strobe tube 20 and fires it in conventional manner. At this time, the tube will be fired by the capacitor C2 for a short period of time on the order of 4 microseconds whereupon the relatively small capacitor C2 becomes discharged. The arc in the strobe then continues to burn, energized to the voltage level stored in the capacitor C1, until the photocell 26 and quench circuit 47 sum to the present trigger voltage. In response to the quench circuit reaching its trigger voltage, the quench tube 48 is rendered conductive to short out the capacitor C1 such that the strobe tube 20 is extinguished. Hence, the DC supplies 40 and 42, the capacitors C1 and C2, the the diode 46 in connection with the quench arrangement provide means for providing a quenchable strobe of short time duration.

Figure 8:
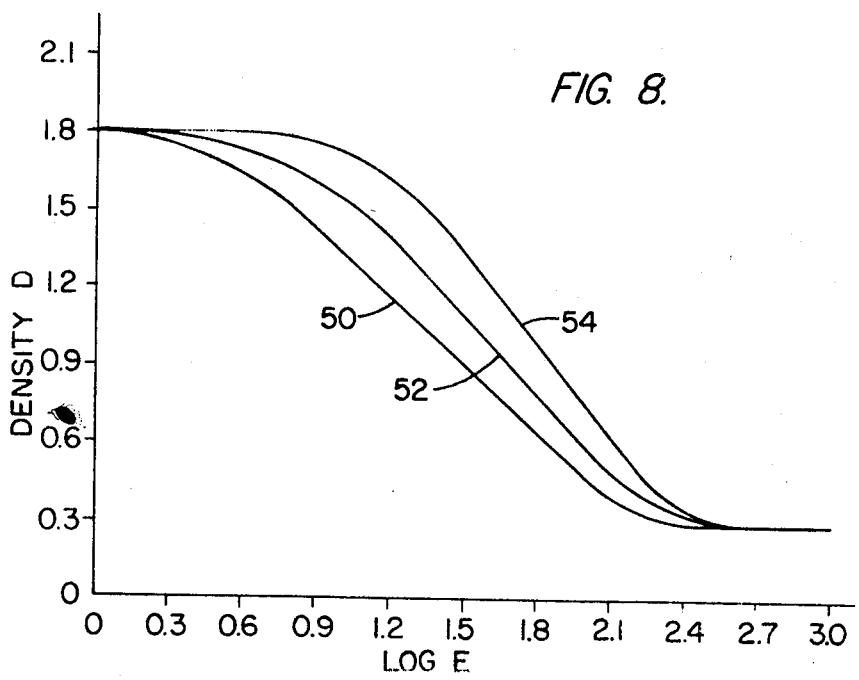
FIG. 8 is a graph illustrating three generalized H & D characteristic curves attainable with different illumination regulation in accordance with the present invention.

It will be appreciated that the time duration required for the quench circuit 47 to reach trigger voltage will depend on the amount of light passing through the filter wedge 30 to the photocell 26 and that the time duration of the strobe flash between 4 and 50 microseconds, as represented by the curve in FIG. 6, will depend on the density of the slide and the density to which the filter wedge is adjusted. Hence, the length of the strobe pulse will depend on the average density or opacity of the slide transparency 18 to be copied. Thus for a very light slide, the strobe 20 will be quenched at or shortly after 4 microseconds, and with a relatively dense slide, the duration of strobe illumination will be extended. It has been found through experimentation however, that a strobe illumination time in excess of 100 microseconds diminishes the effect of reducing the H & D characteristic curve slope reduction previously described with respect to the copy film 16. Correspondingly, it has been found that the extent to which the H & D characteristic curve slope in the film 16 is reduced will vary inversely with the duration of illumination as is represented by the three curves 50, 52 and 54 in FIG. 8. Assuming, for example, that the intermediate curve 52 represents an H & D curve slope of 1 achieved by exposing conventional film materials to a pulse length varying from 4 to 50 microseconds, the slope may be increased to that of curve 54 by employing a pulse length of 100 to 200 microseconds, and an H & D curve having a slope of less than 1 as represented by curve 50 may be provided by a pulse length of under 4 microseconds.

The contrast index may also be varied by employing more than one short pulse, however, two extremely short pulses of given intensity and duration will not provide the same reduction in the slope of the film curve as that achieved by one pulse equal to the total sum of light and duration of the two pulses. The latter discontinuous exposure can be used to vary the film slope and hence the copy contrast, however, such an arrangement will increase the complexity of the copier apparatus.

Figure 7:
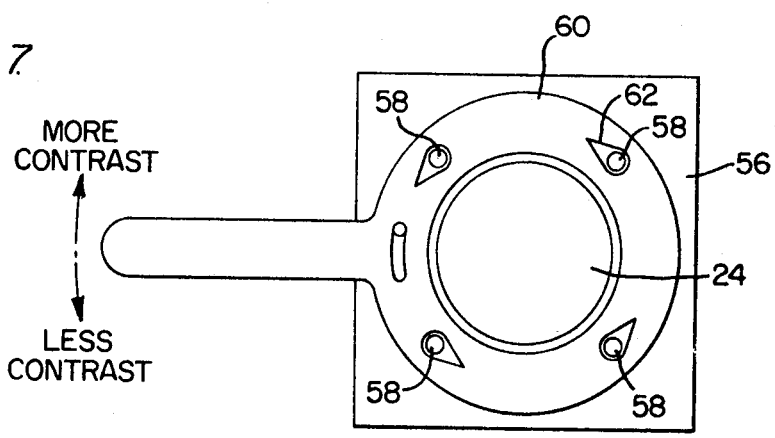
FIG. 7 is a plan view illustrating a portion of an alternative embodiment of the apparatus of the present invention.

A method and apparatus for controlling the contrast index reduction of the copy film 16 can also be effected by exposing the film 16 to low level supplemental illumination or, that is, nonimage forming light emitted by the strobe lamp 20 (or nonfocused light from the slide 18) simultaneously with the image forming light passing through the slide transparency 18 and the lens 24. In FIG. 7 of the drawings, the lens 24 is shown supported by an opaque blinder 56 having a plurality of apertures 58, each of which carry a diffuser element, arranged at uniformly spaced positions about the lens periphery. A diaphragm member 60 is also supported by the plate 56 and rotatably adjustable on the axis of the lens 24 in a manner such that tear-drop shaped openings 62 in the diaphragm ring may adjust or stop down the light passing through the apertures 58. A slot 64 in the diaphragm ring cooperates with a pin in the plate 56 to limit the extent of adjustment. The shutter 25 (FIG. 1) is arranged to control the supplemental illumination as well as the image forming light.

In the above embodiment, some of the light passing through the slide is diffused and transmitted around the lens 24 to thereby act as supplemental, nonimage bearing light. In a similar manner, light from the diffuser 22 (see FIG. 2) may be made to directly bypass both the slide 18 and the lens 24, for example, by mounting the slide 18 within the blinder 56 and the diaphragm 60 rather than in a completely opaque, perimetric mounting member as is the case for the embodiment illustrated in FIG. 1. Alternatively, a separate light source can be employed which is completely synchronized with the main light in duration and timing.

With the arrangement shown in FIG. 7, the measure of contrast in the image formed on the copy film 16 will vary inversely with the amount of supplemental or nonimage bearing light passed through the apertures 58. Thus, minimal contrast is provided with the apertures 58 completely open whereas contrast is increased by reducing the effective area of the apertures 58 by rotating the rings 60 in a clockwise direction as shown in FIG. 7. It should be noted that this supplemental exposure must be coincident with the image bearing exposure in order to avoid lengthening the selected pulse length of the exposure or to prevent intermittent pulses both of which produce an undesirable increase in the contrast index.

The results of actual tests conducted using the apparatus illustrated in FIG. 3 with different films or photographic materials is represented by the H & D curves illustrated in FIGS. 2 and 9–12 of the drawings. As pointed out above, the H & D curve illustrated in FIG. 2 represents the characteristics of the commercially available diffusion transfer color film named "POLACOLOR 2." The technique used to plot the curve illustrated in FIG. 2 involves exposing the film to light passed through a transparent target having an image of a neutral density wedge with the film behind the target being exposed in the manner of a contact print. Specifically, a Xenon lamp having a spectral energy distribution of 5500° K. and an exposure period of 1/125 second was used. Successive density steps were measured using different color filters by which the log exposure (log E) component of each curve could be determined. To this end, the resulting prints were measured for density using a standard densitometer to obtain values plotted on the ordinate of the curve. The average or arbitrarily defined slope of the curve is measured by the angle of a line intersecting the curve at one-quarter and three-quarter values of the total density recorded. The slope of about 1.4 shown in FIG. 2 is typical of POLACOLOR 2.

Figure 11:
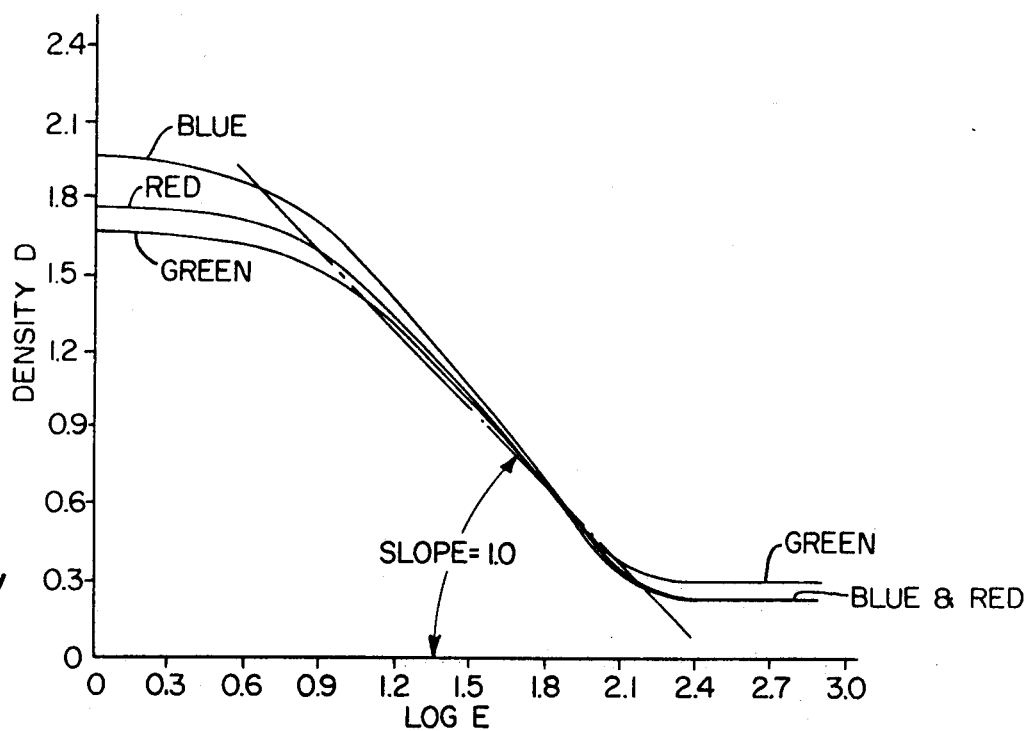
FIG. 11 shows the characteristic curves for the same film represented by FIG. 2 but exposed in accordance with the present invention.

When the above-noted film is exposed to a short pulse of high intensity light using the apparatus described above with respect to FIG. 3, the H & D curves illustrated in FIG. 11 of the drawings resulted. It will be noted in this case that the slope of the curve is reduced to about 1.0. The difference was a result solely of changing the time of exposure of 1/125 second to a short pulse approximating 40 microseconds.

Similar results have been obtained in copying positive slide transparencies. In this respect reference is made to FIGS. 9 and 10 of the drawings. The curve illustrated in FIG. 9 of the drawings is a representative H & D curve of a positive film transparency, specifically a slide film commercially available from Eastman Kodak Company under the trade name "KODACHROME". The slide film was exposed at 1/125 second to a calibrated multiple density target and developed to provide an image transparency of the target. Each individual area of the target image was measured for density and the values thereof plotted against the rated light transmissibility of the corresponding area on the target.

Figure 9:
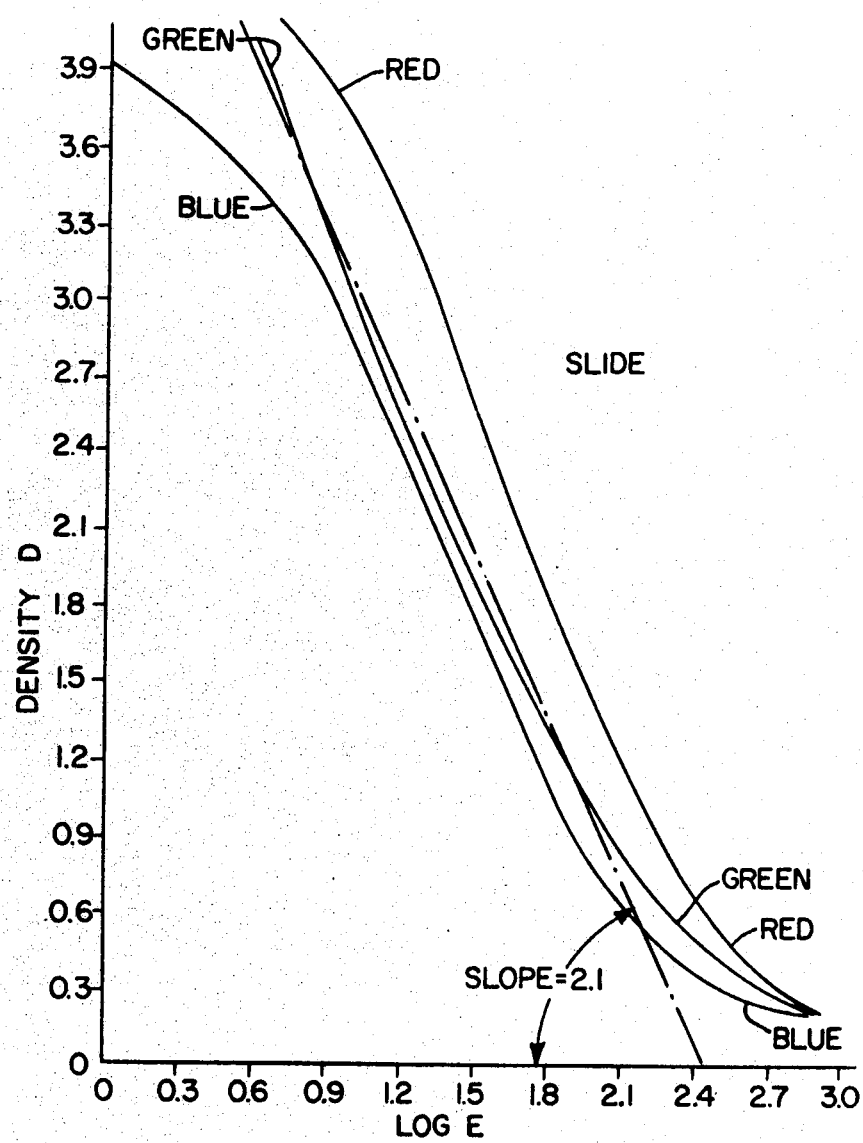
FIG. 9 is a graph showing H & D characteristic curves characterizing a color image in a positive transparency or slide.
Figure 10:
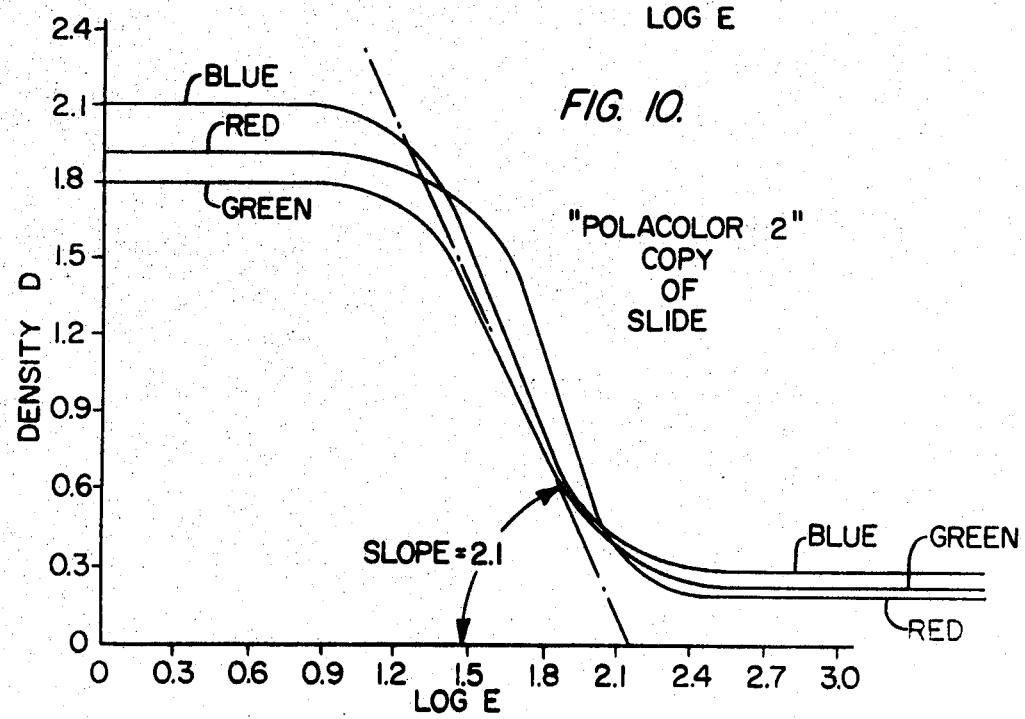
FIG. 10 shows the characteristic curves of a copy of the slide represented in FIG. 9.

The significance of the curve illustrated in FIG. 9 is that the sample KODACHROME slide exhibits an H & D curve slope of about 2.1. This slope, as above-mentioned, corresponds to the contrast index of the image on the slide. Under normal photographic procedures, if a print of the slide were attempted by exposing POLACOLOR 2 film to light projected through the slide transparency, the resulting photograph would exhibit a contrast characteristic corresponding to the product of both the slope of the slide, shown in FIG. 9, and the slope of the POLACOLOR 2 film illustrated in FIG. 2 to result in a contrast index of about 3. However, by exposing the slide of FIG. 9 using a short pulse of light, i.e., 40 microseconds and thus reducing the effective H & D characteristic curve slope of the POLACOLOR 2 film toward 1, a photograph is provided in which the measured H & D curve slope is about 2.1 as shown in FIG. 10 of the drawings.

Figure 12:
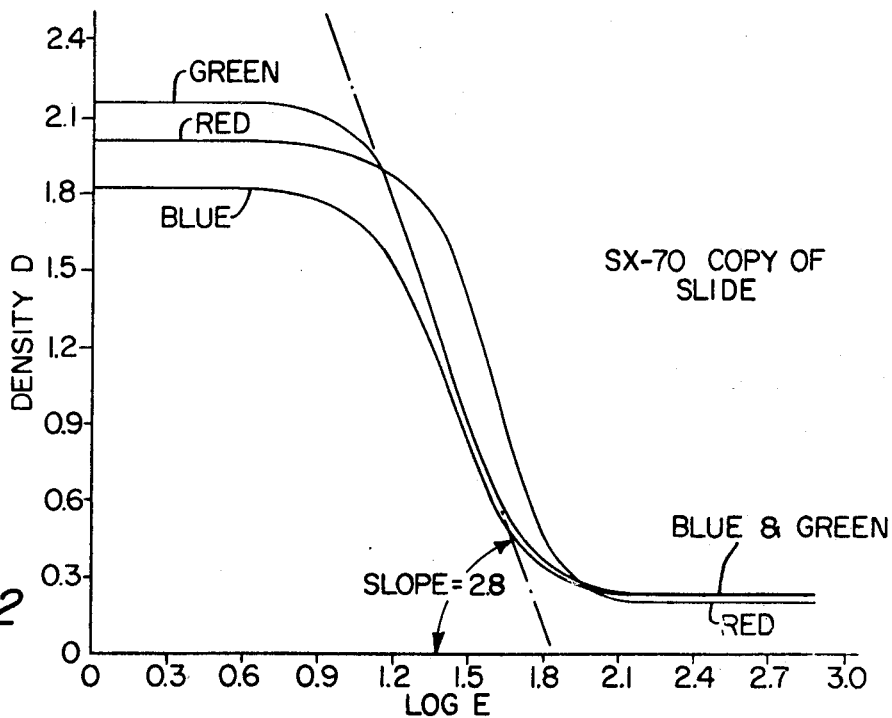
FIG. 12 shows characteristic curves of a copy of the slide of FIG. 9, but employing a different copy film than that of FIG. 10.

Similar results have been obtained using other diffusion transfer films of the type described in U.S. Pat. No. 3,647,437 and 3,415,644 and which is available commercially from the Polaroid Corporation under the trademark "SX-70". This film has a normal H & D characteristic curve slope of approximately 1.8 using the sensitometric method described above with respect to the curve illustrated in FIG. 2 of the drawings. The curve characterizing a copy made of the KODACHROME slide (represented by FIG. 9 of the drawings) using SX-70 film and the apparatus of FIG. 3, is illustrated in FIG. 12. As can be seen therein, an acceptable slide copy is provided with a slope of about 2.8, the latter slope being a significant reduction from what would be the expected product, about 4, of the normal slope of SX-70 film and the slope of the slide.

Figure 15:
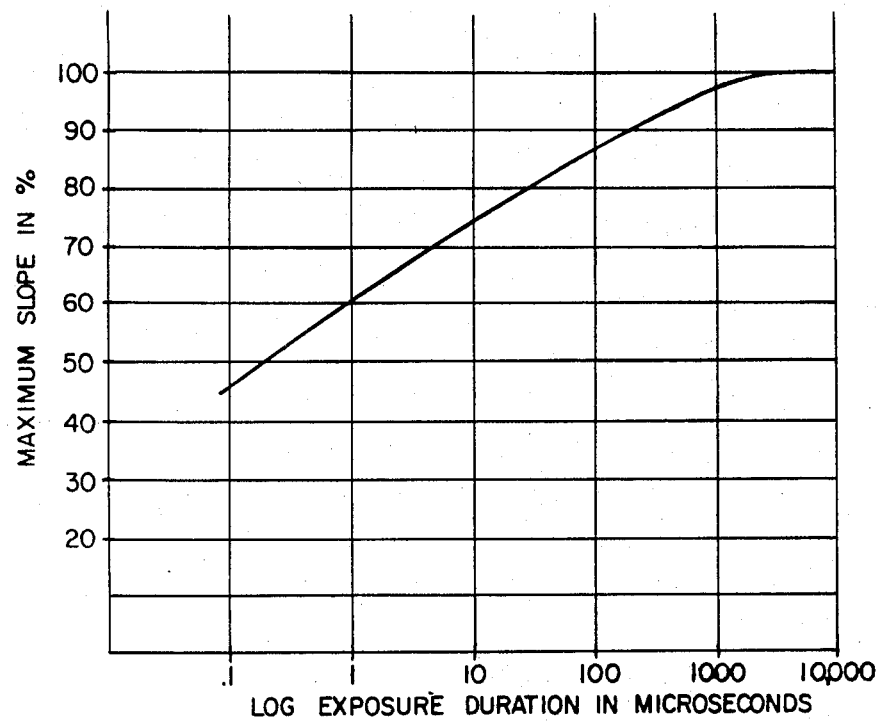
FIG. 15 is a single line graph of the slopes of H & D curves obtained at different exposure intervals from a diffusion transfer film of the type represented in FIGS. 2 and 11.

FIG. 15 is a normalized graph of the maximum slope values of H & D curves obtained at different exposure intervals from POLACOLOR 2 type film. Herein, the maximum slope at 10,000 microseconds is taken as 100%. For clarity, a single line curve is shown which represents an average of the three lines representing the three primary colors, and the three colors would be expected to provide curves similar to that shown, but somewhat shifted therefrom. In this figure, the maximum slope, rather than the previously defined average slope (one-quarter to three-quarter slope) was employed for convenience and accuracy of measurement. It should be noted, however, that the average slope will follow the maximum so as to be reduced accordingly therewith.

As can be seen from FIG. 15, the maximum slope drops rapidly under 1,000 microseconds and is significantly reduced as 100 microseconds is approached. Hence, in the exposure range from 1 microsecond to 100 microseconds, the maximum slope can be made to vary from 60 to 87% of that at 10,000 microseconds. Consequently, while the reduction in slope is small at values over a few hundred microseconds, some notable reduction is still available even at 100 to 300 microseconds.

While the novel arrangement has been described and illustrated with regard to copying photographs, it should be realized that it can have application in any area in which a contrast index of lower than that specified for a given film is desired, for example, where it is desired to vary an original photograph of a natural scene.

To provide more complete control of the illumination source 20 of the apparatus of FIG. 3, a strobe system of selective voltage, and hence selective illumination pulse intensity, is provided. In this regard, the copy apparatus of FIG. 3 may be modified as shown in FIG. 13 by adding a low intensity incandescent lamp 74 and by replacing the high voltage supply of FIG. 5 with a variable supply 72, as shown in FIG. 14, having a range from 35–2,000 volts and including a voltage control circuit 70 which is responsive to the photocell 26.

Figure 13:
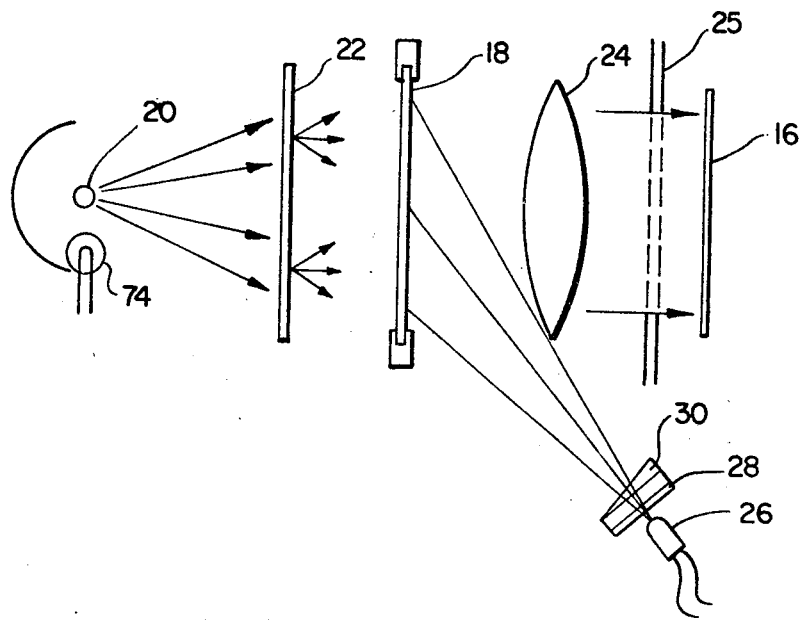
FIG. 13 schematically illustrates an alternate embodiment of the apparatus of the invention.
Figure 14:
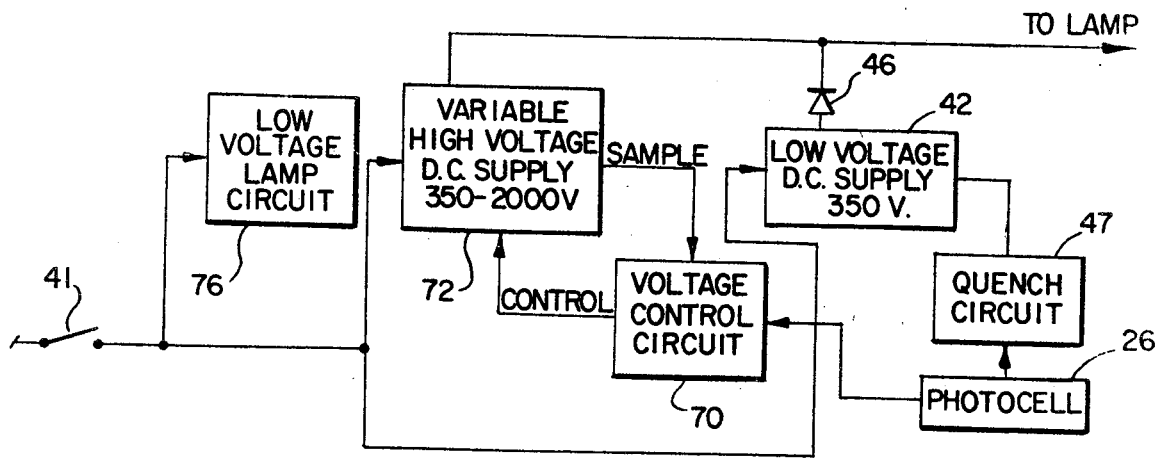
FIG. 14 illustrates a circuit portion operable with the illumination system of FIG. 13.

The system of FIG. 13, while not restricted to preevaluation of the slide density, is preferably operated to initially evaluate the slide and determine the desired level of illumination intensity compatible with proper exposure of the receiving film at a short fixed time, i.e., 4 microseconds.

The voltage control circuit 70 comprises a comparator network which evaluates the photocell output level against a reference voltage which is proportional to the voltage on capacitor C2, and responsive to this evaluation, controls the voltage supply 72 by means of a variable transformer, for example, a motor controlled variac or a solid state voltage control circuit. While the reference voltage may be manually variable, it is preferably set or selected to provide an illumination intensity level suitable to provide, within about 4 microseconds, essentially 90% of the total light needed for exposure of the copy material independent of the slide density.

In this arrangement, the low intensity lamp 74 is mounted in close proximity to the strobe 20 and is energized as explained below both prior to and during the exposure. The illumination level of the lamp 74 is made quite low so that its contribution to the exposure is negligible; particularly under the extremely short exposure duration of the present invention. Moreover, its contribution to the quench circuit summing will also be negligible since the charging time of the strobe is short.

The operation of the apparatus of FIGS. 13 and 14 will now be explained. Initially, the shutter 25 is held closed while the strobe is charged to its controlled or selected level. Thus, the switch 41 is closed to initiate strobe charging and to also operate the lamp 74 from a low voltage lamp circuit 76. At this time, the slide transmits light from the lamp to the photocell 26 but film exposure is prevented by the closed shutter 25. In accordance with the photocell output, the control circuit 72 adjusts the maximum level of the high voltage supply to the desired level in accordance with slide density so as to provide about 90% of the total exposure illumination in the initial high level portion of the pulse with the remaining 10% left to the quenchable, low level portion of the pulse.

Once the strobe has reached the selected charge, the system is ready for copying operation. The actuator 45 is then operated to both open the shutter 25 and to fire the strobe. As the strobe begins to fire, the photocell now is subjected to high intensity light, consequently a gate switch (not shown) or other overload protection is provided for the input to the voltage control unit. Alternatively, the output of photocell 26 may be switched from the control circuit 70 to the quench circuit 47 by the actuator 45. The illumination intensity is thus adjusted automatically by the photocell 26 for each individual slide or print, whichever is to be copied, by adjusting the voltage on capacitor C2 to provide just the correct amount of light energy to obtain about 90% of the total exposure required. This method of adjusting the light intensity affords the regulation of total integrated light output without greatly varying the flash pulse duration, as is the case with a conventional quench strobe. By this method, accurate exposure control is possible since the quenchable secondary low level strobe output enables the strobe to be in a closed loop operation. The photocell integrates both the high intensity and low intensity light emitted from the tube. It will be appreciated that the stability and accuracy of a closed loop system versus a pre-measure system are greatly improved and calibration requirements simplified.

It is sometimes desirable to enhance contrast of the resulting copy. This then would be obtained by lengthening the time of the light flash. In the configuration of the apparatus shown in FIGS. 13 and 14, there is achieved simply by manually lowering the comparator reference voltage such that the resulting exposure from the high intensity flash is a smaller portion of the total required exposure, e.g. 40%; the remaining 60% being supplied by the long duration low intensity portion of the light flash. The total time of the light flash is then greatly lengthened resulting in an H & D curve with greater slope than that obtained by the system with a higher reference level for the comparator.

Thus, it will be seen that as a result of the present invention, a highly effective method and apparatus is provided for reducing the slope of the H & D curve of photographic film and for copying photographic positives. Although the invention has been described with respect to copying and with specific examples of photographic materials or films for use in making the photographic copies, it is believed that the invention has other applications and is applicable to other photographic films and materials such as print papers. In addition, the method and apparatus described for use with slide transparencies may be used with reflective prints merely by reflection of light from the print to be copied rather than the projection of light through the original. Accordingly, it is contemplated that various modifications and/or changes may be made in the embodiments described and illustrated herein without departing from the invention. The described embodiments and examples are therefore illustrative of preferred embodiments only, not limiting, and it is intended that the full spirit and scope of the invention be determined by reference to the appended claims.

What is claimed is:

1. A photographic flash circuit having an electronic strobe tube operable at high voltage to produce a relatively large amount of illumination of high intensity, said circuit having a storage capacitor of relatively small capacitance, means for charging said capacitor to a relatively high voltage, means for coupling said storage capacitor to said strobe tube, and means for triggering said strobe tube into conductance to thereby produce a short, high intensity pulse of illumination responsive to discharge of said storage capacitor through said strobe tube, the improvement comprising:

means for automatically producing a relatively small amount of additional illumination of relatively constant low intensity from said strobe tube following said high intensity pulse, and means operable for terminating said low intensity illumination to thereby provide precise control over the total illumination produced, said producing means including an auxiliary capacitor of comparatively large capacitance, means for coupling said auxiliary capacitor to said strobe tube so as to permit current flow thereto while blocking current from said storage capacitor to said auxiliary capacitor whereby, following charging of said capacitors and upon triggering of said strobe tube, a burst of high intensity illumination of relatively short duration is automatically followed by additional illumination at an approximately constant level of comparatively low intensity for a comparatively long duration whose termination can be controlled to determine the total illumination.

2. The flash circuit of claim 1 wherein said means for coupling said auxiliary capacitor to said strobe tube includes means for preventing current flow from said storage capacitor to said auxiliary capacitor, and said terminating means comprises a quench circuit coupled across said auxiliary capacitor between said auxiliary capacitor and said means for preventing current flow so that said quench circuit, while operable to quench said low level illumination, is isolated from the high voltage applied to said strobe tube for said high intensity pulse.

3. The flash circuit of claim 1 including a high voltage input coupled to said storage capacitor and a low level voltage input coupled to said auxiliary capacitor, and additionally including means for varying the value of said high input level to alter the intensity of said high intensity pulse.

* * * * *